(12) United States Patent
Bissett

(10) Patent No.: US 11,097,604 B2
(45) Date of Patent: Aug. 24, 2021

(54) GOLF CLUB RAIN COVER FOR GOLF CARTS

(71) Applicant: Bissett, Inc., Reston, VA (US)

(72) Inventor: John E. Bissett, Virginia Beach, VA (US)

(73) Assignee: BISSETT, INC., Reston, VA (US)

( * ) Notice: Subject to any disclaimer, the term of this patent is extended or adjusted under 35 U.S.C. 154(b) by 0 days.

(21) Appl. No.: 17/139,850

(22) Filed: Dec. 31, 2020

(65) Prior Publication Data
US 2021/0206247 A1 Jul. 8, 2021

Related U.S. Application Data

(60) Provisional application No. 62/957,926, filed on Jan. 7, 2020.

(51) Int. Cl.
*B60J 7/10* (2006.01)
*B60J 11/06* (2006.01)
*B60J 11/00* (2006.01)

(52) U.S. Cl.
CPC .............. *B60J 7/104* (2013.01); *B60J 7/102* (2013.01); *B60J 11/00* (2013.01); *B60J 11/06* (2013.01); *B60Y 2200/86* (2013.01)

(58) Field of Classification Search
CPC ... B60J 11/00; B60J 7/104; B60J 7/102; B60J 11/06; B60Y 2200/86

USPC ......................................... 296/136.01, 136.1
See application file for complete search history.

(56) References Cited

U.S. PATENT DOCUMENTS

| | | | | |
|---|---|---|---|---|
| 6,007,134 A | * | 12/1999 | Weston | B60J 11/00 296/83 |
| 6,199,932 B1 | * | 3/2001 | Welsh | B60J 7/10 296/102 |
| 7,234,753 B2 | * | 6/2007 | Held | A63B 55/60 296/100.18 |
| 2003/0183260 A1 | * | 10/2003 | Gaskins | A45B 25/28 135/34.2 |

* cited by examiner

*Primary Examiner* — Joseph D. Pape

(57) ABSTRACT

The golf club cover is an apparatus that acts as a rain cover for protecting golf clubs in golf bags, placed in the rear section of a golf cart. To accomplish this, the apparatus includes a transparent sheet that is held securely between two PVC rod structures, such that the transparent sheet does not hinder the rear view of the driver. The rod structures have bungee cords with fastening elements at the end of the bungee cords, such that the apparatus may be attached on the golf cart roof and body, without having to have any additional fastening features on the golf cart. Further, the apparatus may be rolled up and compactly stored within the golf bag in a sleeve. Furthermore, the arrangement of the bungee cords at the lower end enables a user to retrieve contents from one golf bag without exposing the other bag to the elements.

20 Claims, 10 Drawing Sheets

GOLF CLUB RAIN COVER FOR GOLF CARTS

The current application claims a priority to the U.S. Provisional Patent application Ser. No. 62/957,926 filed on Jan. 7, 2020.

FIELD OF THE INVENTION

The present invention relates generally to a golf club rain cover. More specifically, the present invention is a cover for the rear section of a golf cart, such that golf clubs in one or more golf bags and/or a golf cart basket, that are set at the rear section of the golf cart are protected from the rain.

BACKGROUND OF THE INVENTION

Golfers often commute along the golf course in golf carts and carry one or two bags of golf clubs in the rear section of the golf cart. A majority of the golf bags if not all, have open top ends, which leads to the heads of the golf clubs being exposed. It is always desirable to protect the golf clubs/golf bags placed behind a golf cart from rain and other elements. In the current market, there are many protective covers and rain covers available for golf carts. However, most of them involve many mechanical features and fasteners, such as zippers, snaps, clips etc. for attaching these covers to the golf carts, and/or require specific tools for installation. These mechanical features also tend to break or get rusty depending on the materials used. A golf cart club cover which is light weight (3 lbs.), easy to install and uninstall on/from a golf cart, and which can be stored within a golf bag when not in use, is a rare find in the current market.

An objective of the present invention is to provide users with an apparatus that acts as a rain cover for protecting golf clubs in golf bags placed in the rear section of a golf cart. It is an aim of the present invention to provide a removable and reusable rain cover that may be attached and removed from the golf cart in a simple and easy manner. According to the present invention, the apparatus comprises a transparent/clear (vinyl) sheet that is held securely between two PVC (poly vinyl chloride) rod structures, such that the transparent/clear sheet makes sure the rear view of the driver is not hindered, and the golf clubs in the golf bags at the rear are visible for easy retrieval. The rod structures have bungee cords with fastening elements at the end of the bungee cords, such that the apparatus becomes a self-supporting rain cover that may be attached on the golf cart roof and body, without having to have any additional fastening features on the golf cart. It is further an aim of the present invention to be able to remove the apparatus, roll it up, place in a sleeve, and store within the golf bag in a compact fashion, when not in use. Furthermore, in situations where more than one golf bags are placed in the rear section of the golf cart, the specific arrangement of the bungee cords at the lower end of the present invention enables a user to retrieve contents from one golf bag, without exposing the other bag to the elements. Thus, the present invention is a simple and user-friendly apparatus, which may be easily installed, uninstalled and carried around in a golf cart.

DETAIL DESCRIPTIONS OF THE INVENTION

Figure 1:
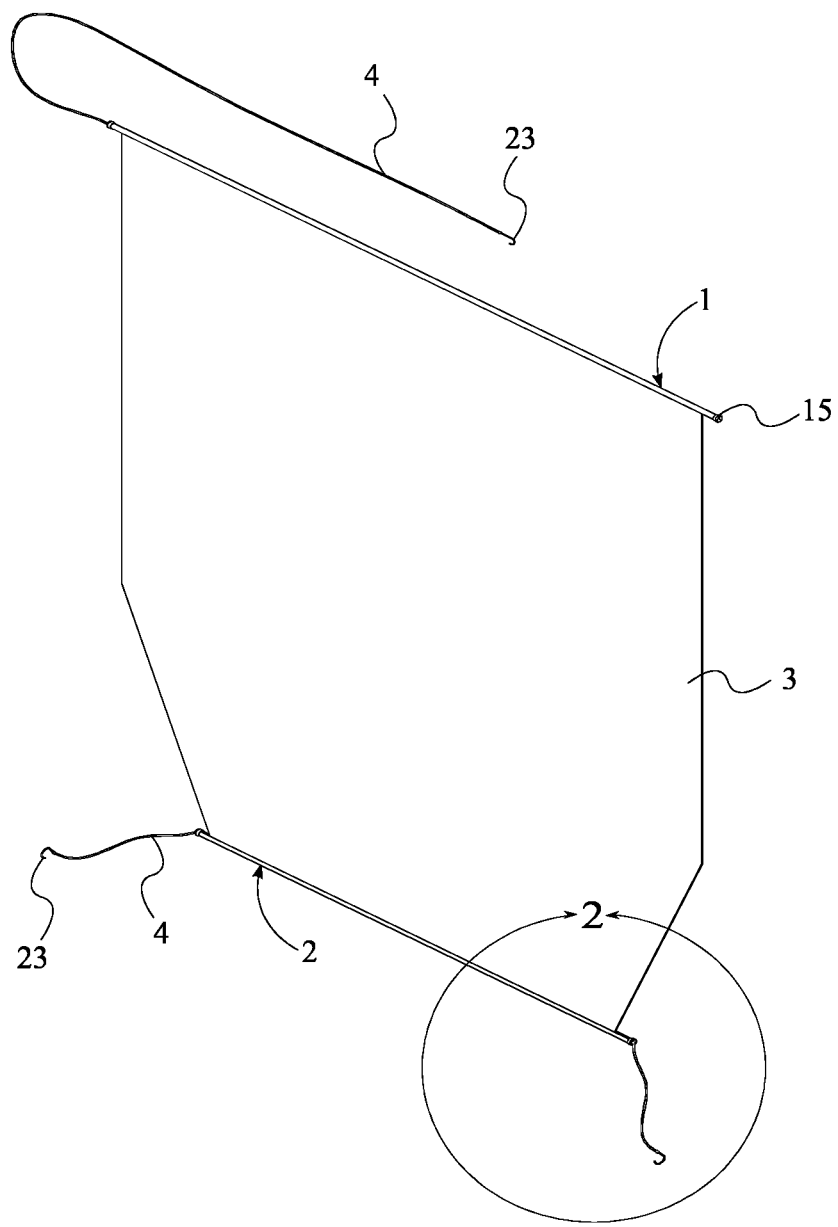
FIG. 1 is a top-front-left perspective view of the present invention.

All illustrations of the drawings are for the purpose of describing selected versions of the present invention and are not intended to limit the scope of the present invention.

In reference to FIG. 1 through FIG. 10, the present invention is a rain cover for golf clubs in a golf cart. An objective of the present invention is to provide users with an apparatus that acts as a rain cover for protecting golf clubs in golf bags placed in the rear section of a golf cart. It is an aim of the present invention to provide a removable and reusable rain cover that may be attached and removed from the golf cart in a simple and easy manner. According to the present invention, the apparatus comprises a transparent/clear (vinyl) sheet that is held securely between two PVC rod structures. The transparent/clear sheet ensures that the rear view of the driver is not hindered and the golf clubs in the golf bags at the rear are visible for easy retrieval. The rod structures have bungee cords with fastening elements at the end of the bungee cords, such that the apparatus becomes a self-supporting rain cover that may be attached on the golf cart roof and body, without having to have any additional fastening features on the golf cart. It is further an aim of the present invention to be able to remove the apparatus, roll it up, place in a sleeve, and store within the golf bag in a compact fashion, when not in use. It is an objective of the present invention to protect the golf clubs on the rear section of the golf cart from rain such that, one or more golf bags placed in the rear section is protected from rain. Furthermore, in situations where more than one golf bags are placed in the rear section of the golf cart, the specific arrangement of the bungee cords at the lower end of the present invention enables a user to retrieve contents from one golf bag, without exposing the other bag to the elements. Thus, the present invention is a simple and user-friendly apparatus, which may be easily installed, uninstalled and carried around in a golf cart.

The following description is in reference to FIG. 1 through FIG. 10. According to a preferred embodiment of the present invention, the rain cover comprises a first rod 1, a second rod 2, a transparent sheet 3, and a plurality of fastening cords 4. The first rod 1 comprises a first dowel 5 and a first pipe 6. Preferably, the first dowel 5 is a wooden dowel (preferably ½" in thickness) and the first pipe 6 is a PVC pipe (preferably ¾" in thickness). It is also preferred that the first pipe 6 has dimensions to fit within a rear roof gutter of any standard golf cart. Examples of such golf carts include, but are not limited to E-Z-GO, Yamaha, Club Car, etc. Similarly, the second rod 2 comprises a second dowel 7 and a second pipe 8, wherein the second dowel 7 is a wooden dowel (½" thick) and the second pipe 8 is a PVC pipe (½" thick). However, any other hollow cylindrical structures, other than PVC pipes, and any other strong rod like structures other than wooden dowels may be employed, as long as the intended purpose of the present invention is not hindered. Further, the first pipe 6 comprises a first cavity 9 and the second pipe 8 comprises a second cavity 10, wherein the first cavity 9 traverses through the first pipe 6, and the second cavity 10 traverses through the second pipe 8. This is because, the first dowel 5 is positioned within the first cavity 9, and the second dowel 7 is positioned within the second cavity 10. In other words, the first dowel 5 placed within the first cavity 9 of the first pipe 6 constitutes the first rod 1 and the second dowel 7 placed within the second cavity 10 of the second pipe 8 constitutes the second rod 2.

As seen in FIG. 1, FIG. 3, FIG. 6, and FIG. 8, the transparent sheet 3 is connected between the first rod 1 and the second rod 2. In the preferred embodiment, the transparent sheet 3 constitutes a major portion of the present invention that provides protection from rain, wherein the first rod 1 and the second rod 2 act as the terminal support elements. It is preferred that the transparent sheet 3 is a vinyl sheet that is waterproof and has a minimum thickness of 20 gauge. The transparency of the transparent sheet 3 provides a better rear vision for the driver of the golf cart and provides better vision and easier access to the desired golf clubs or other properties at the rear storage section of the golf cart. However, any other transparent material that is known to one of ordinary skill in the art and which will not hinder the intended purpose of the present invention may be used. Further, according to the preferred embodiment, at least one first cord 11 is terminally connected to the first rod 1, wherein the first cord 11 is from the plurality of fastening cords 4. Similarly, at least one second cord 12 is terminally connected to the second rod 2, wherein the second cord 12 is from the plurality of fastening cords 4. This arrangement of the first cord 11 and the second cord 12 enables efficient fastening of the rain cover onto the golf cart.

Figure 9:
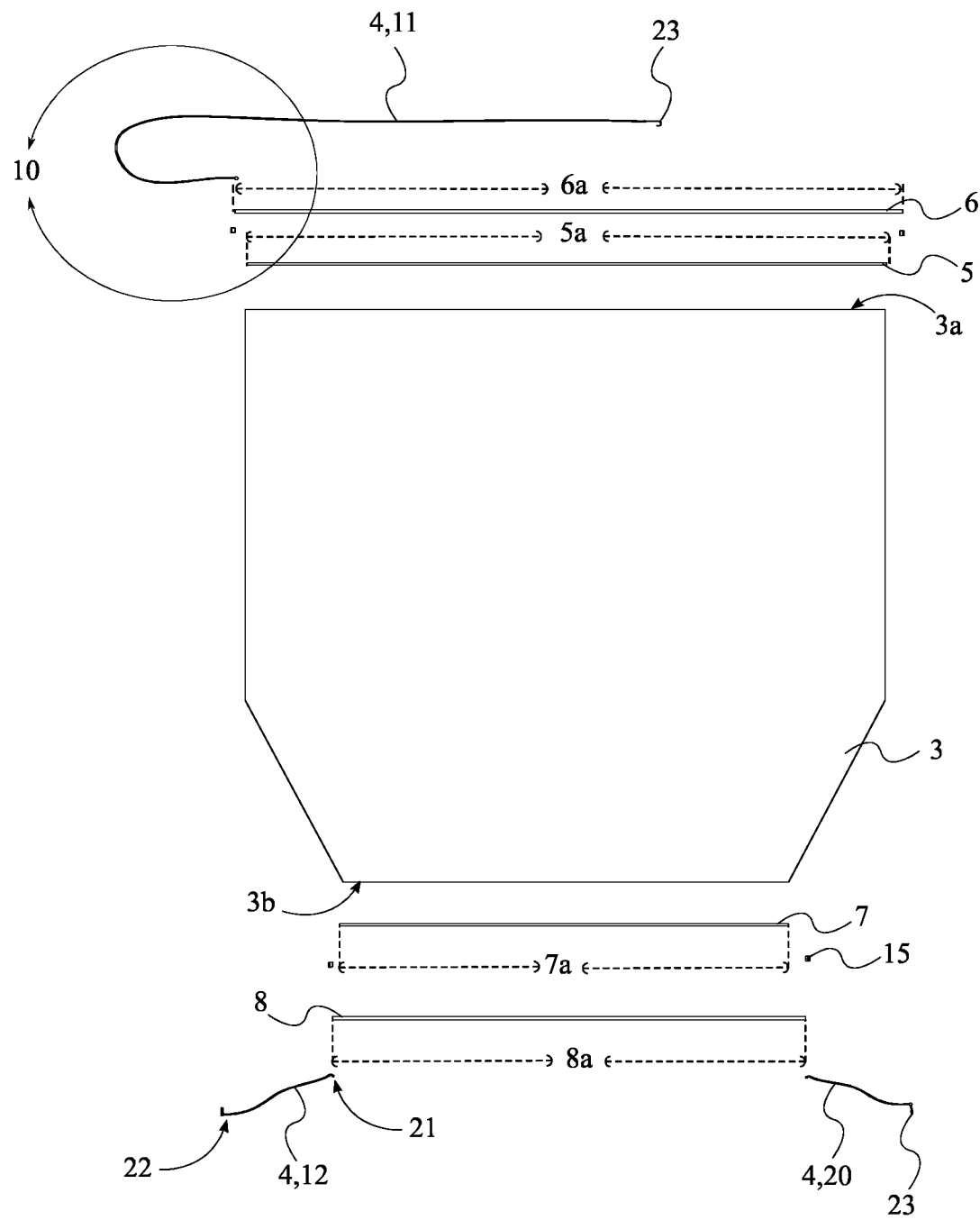
FIG. 9 is an exploded view of FIG. 8.
Figure 10:
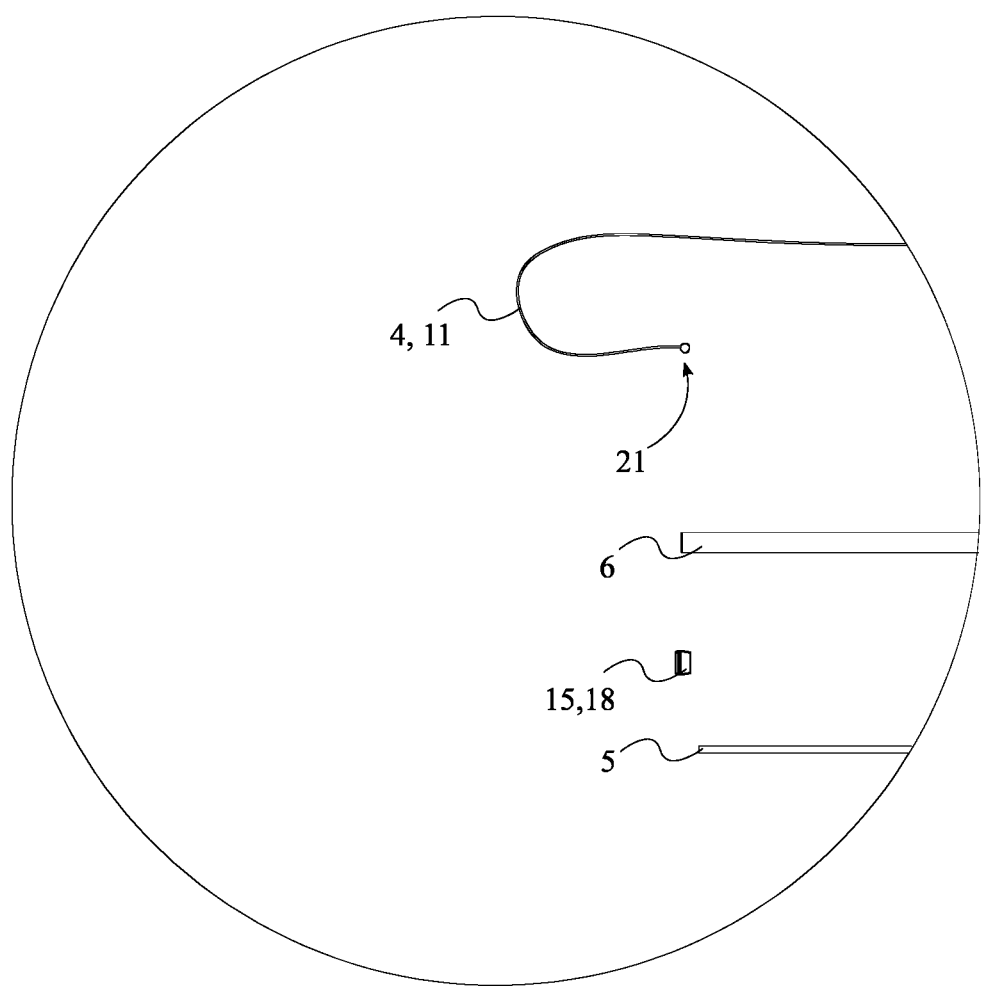
FIG. 10 is a detailed view of section 10 of FIG. 9.

Continuing with the preferred embodiment of the present invention, the transparent sheet 3 comprises a first edge 3*a* and a second edge 3*b*. As seen in FIG. 9, the first edge 3*a* is positioned opposite to the second edge 3*b* across the transparent sheet 3. Further, in order to accomplish the desired positioning of the rain cover on the golf cart, the first edge 3*a* is attached to the first dowel 5 and the second edge 3*b* is attached to the second dowel 7. Preferably, the transparent sheet 3 is securely attached to the first dowel 5 and the second dowel 7 with the help of double-sided tape and stapling pins. However, any other adhesives or fastening techniques that are known to one of ordinary skill in the art may be used to attach the transparent sheet 3 to the first dowel 5 and the second dowel 7.

Figure 2:
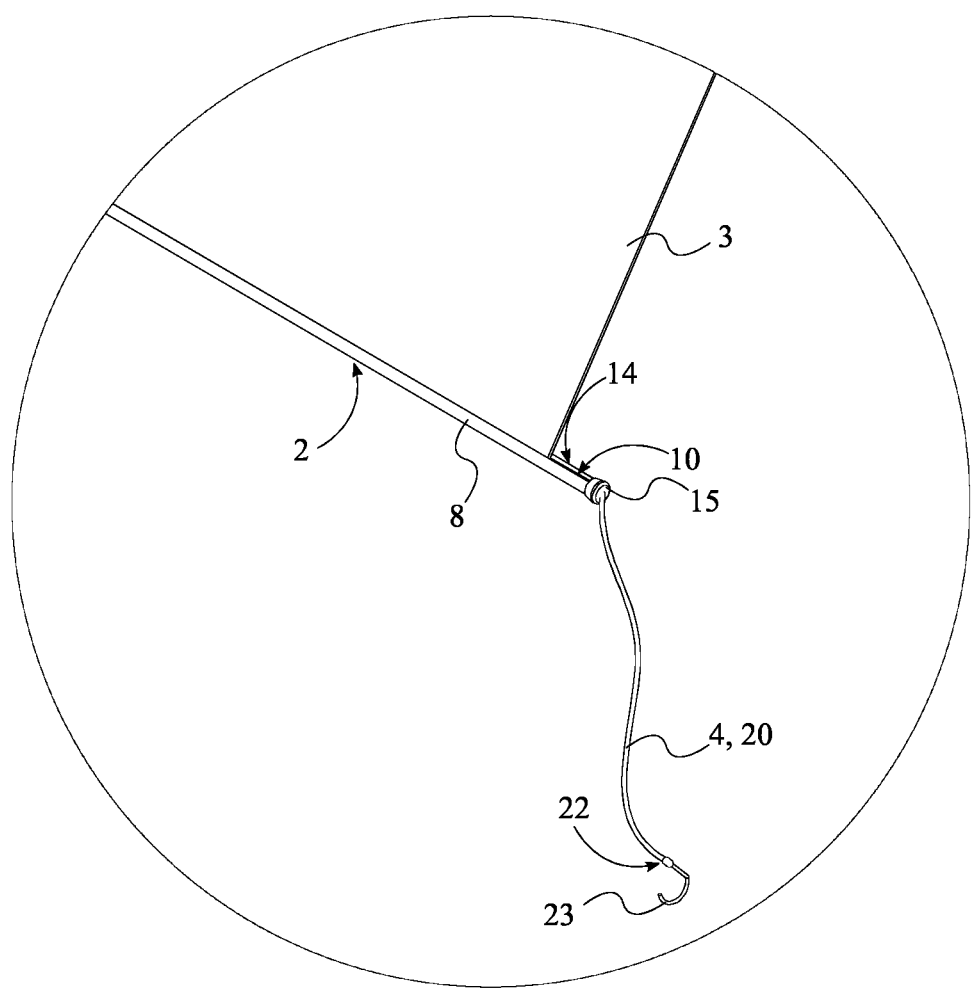
FIG. 2 is a detailed view of section 2 of FIG. 1.
Figure 3:
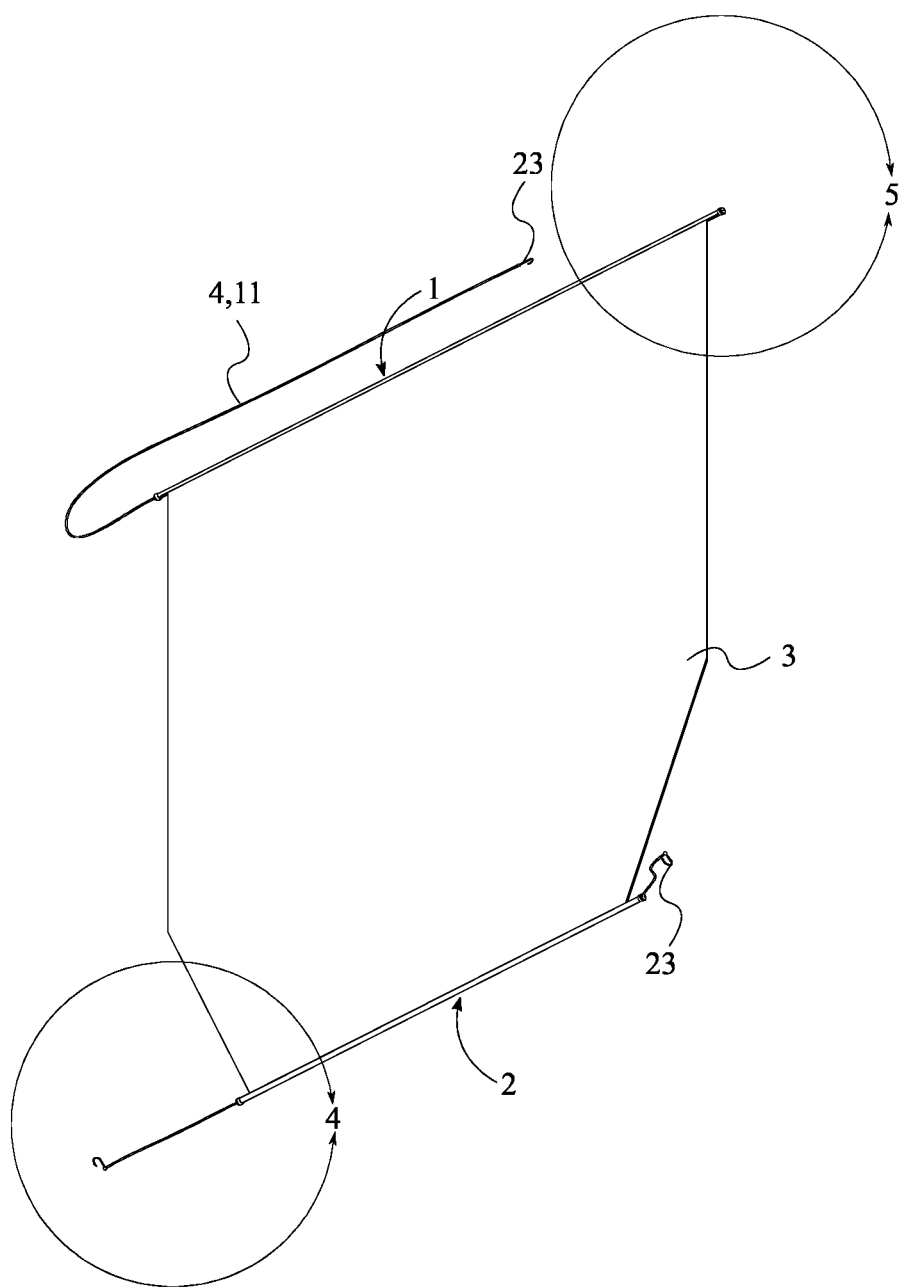
FIG. 3 is a bottom-front-left perspective view of the present invention.
Figure 4:
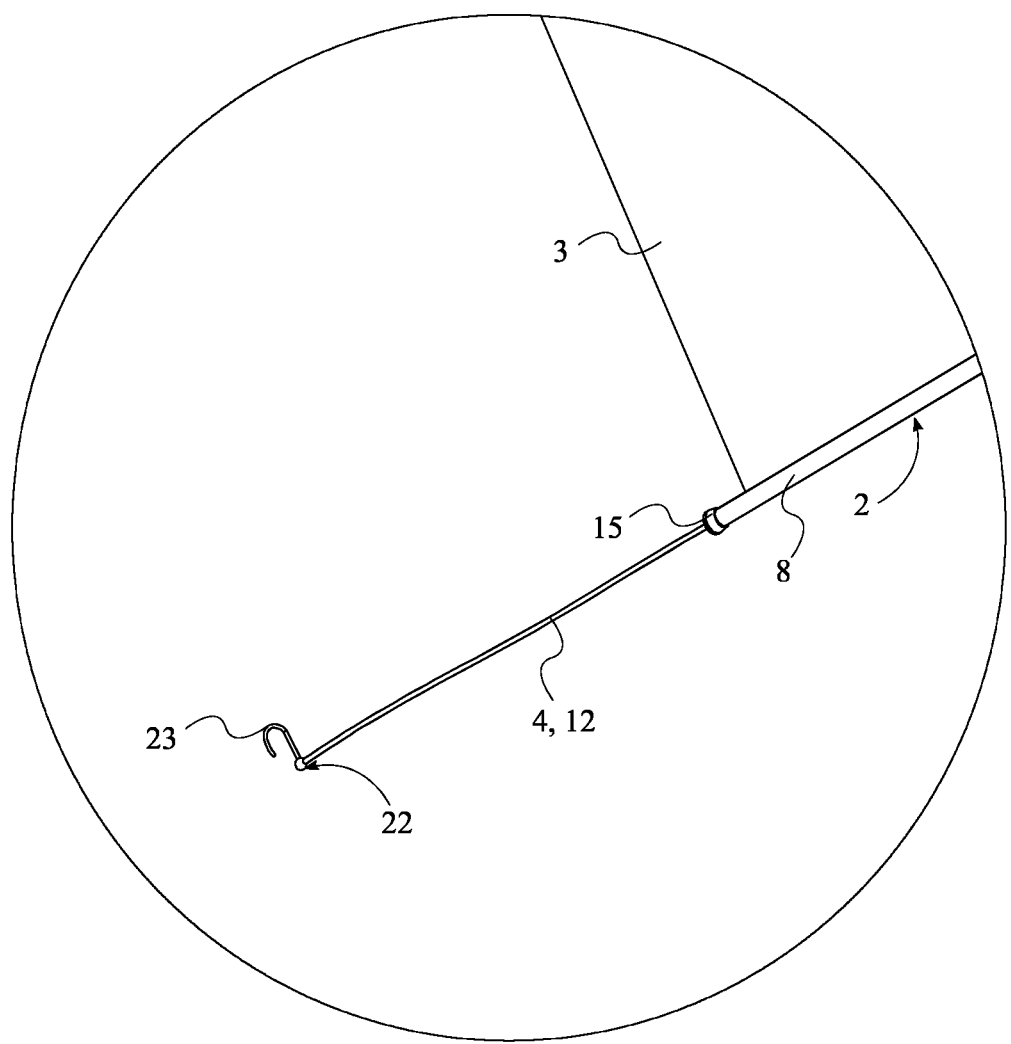
FIG. 4 is a detailed view of section 4 of FIG. 3.
Figure 5:
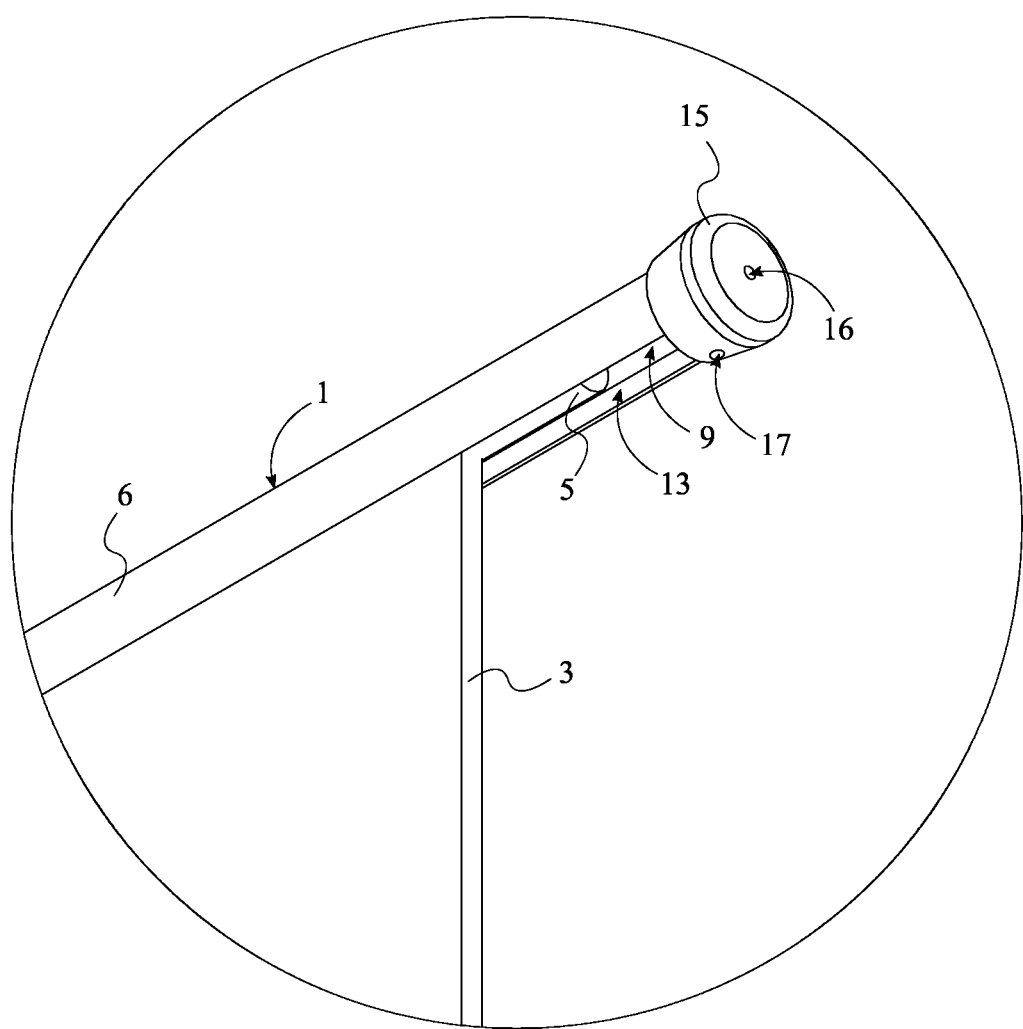
FIG. 5 is a detailed view of section 5 of FIG. 3.
Figure 6:
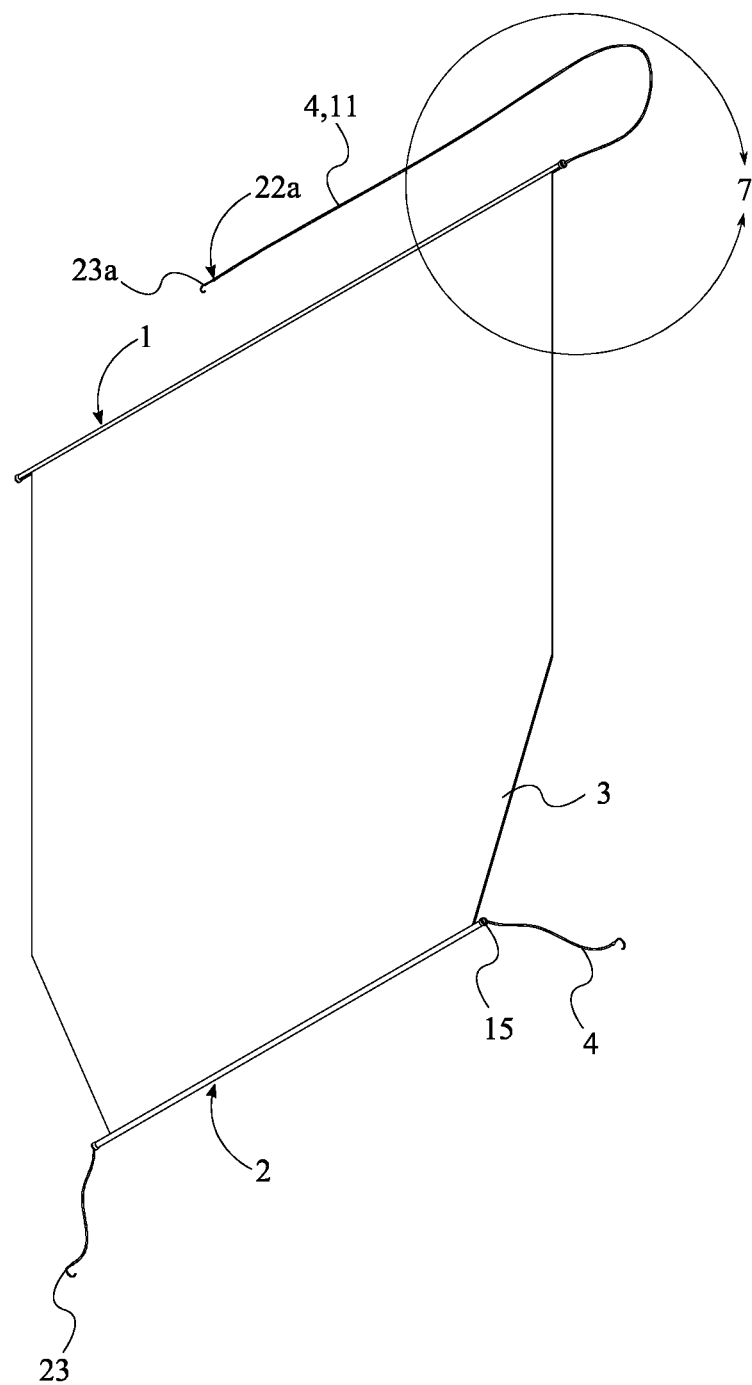
FIG. 6 is a bottom-rear-right perspective view of the present invention.

As seen in FIG. 5, the present invention comprises a first slit 13, wherein the first slit 13 laterally traverses through the first pipe 6. Preferably, the first slit 13 it a small opening along the length of the first pipe 6, with a slit-width ranging a few centimeters. Accordingly, the first edge 3*a* of the transparent sheet 3 is engaged within the first slit 13. In other words, the first edge 3*a* of the transparent sheet 3 passes through the first slit 13 to be engaged with the first dowel 5 within the first pipe 6. Similarly, the present invention comprises a second slit 14, wherein the second slit 14 laterally traverses through the second pipe 8. As seen in FIG. 2, the second edge 3*b* of the transparent sheet 3 is engaged within the second slit 14, such that the second edge 3*b* of the transparent sheet 3 passes through the second slit 14 and is attached with the second dowel 7 within the second pipe 8.

As seen in FIG. 9, the first pipe 6 comprises a first length 6*a*, the second pipe 8 comprises a second length 8*a*, the first dowel 5 comprises a third length 5*a*, and the second dowel 7 comprises a fourth length 7*a*. Preferably, the first length 6*a* is similar to the width of the upper rear section of the golf cart roof and the second length 8*a* is similar to the distance between the fenders at the rear of the golf cart. This is so that the first rod 1 may be attached to the upper rear section of the golf cart efficiently and the second rod 2 does not protrude outside the width of the golf cart and cause any obstruction. Accordingly, the first length 6*a* is longer than the second length 8*a*, the third length 5*a* is longer than the fourth length 7*a*. Further, the third length 5*a* is smaller than the first length 6*a*, and the fourth length 7*a* is smaller than the second length 8*a*. This is because the first dowel 5 and the second dowel 7 has to fit within the dimensions/length of the first pipe 6 and the second pipe 8 respectively. Furthermore, in the preferred embodiment, the first rod 1 and the second rod 2 are cylindrical. However, the first dowel 5, the second dowel 7, the first pipe 6 and the second pipe 8 may have any other dimensions and shape, as long as the intents of the present invention are not altered.

It is an aim of the present invention to provide protection from rain for golf clubs placed within the rear section of the golf cart. In order to accomplish this, the transparent sheet 3 comprises a hexagonal shape. This shape enables the transparent sheet 3 to cover the rear section of the golf cart in a confined yet protective fashion, ensuring there are no protruding sections that might hinder with external objects in the close proximity of the cart. However, the transparent sheet 3 may comprise any other shape, as long as the objectives of the present invention are not altered. Further, the transparency of the transparent sheet makes sure the rear view of the driver is not hindered, and the golf clubs in the golf bags at the rear are visible for easy retrieval. In an alternate embodiment, the rain cover may not be transparent.

Continuing with the preferred embodiment, the present invention comprises a plurality of end caps 15. The plurality of end caps 15 enables to contain the first dowel 5 and the second dowel 7 within the first pipe 6 and the second pipe 8 respectively in a secure fashion and prevent them from sliding off through the open ends of the first pipe 6 and second pipe 8. Accordingly, each of the plurality of end caps 15 is mounted over a corresponding end 1*a* of the first rod 1 and the second rod 2. Preferably, the plurality of end caps 15 comprises PVC as the end cap material. However, the plurality of end caps 15 may comprise any other material, shape, components and arrangement of components, as long as the objectives of the present invention are not altered. It is further preferred that the plurality of end caps 15 comprises a plurality of end cap holes 16, wherein each of the plurality of end cap holes 16 traverses centrally through each of the plurality of end caps 15. The plurality of end cap holes 16 enables to attach the plurality of fastening cords 4 to the first rod 1 and the second rod 2, thereby enabling, temporary mounting of the present invention to the golf cart. In other words, the holes in the center of the end caps enable to secure the plurality of fastening cords 4 terminally within the first rod 1 and second rod 2. Additionally, as seen in FIG. 5, the present invention comprises a plurality of drainage holes 17, wherein each of the plurality of drainage holes 17 laterally traverses through a corresponding endcap 18 from the plurality of end caps 15. Preferably, the plurality of drainage holes 17 is drilled into the plurality of end caps 15, so that they act as 'weep' holes to allow for water drainage, if any rainwater gets collected within the first rod 1 and second rod 2.

Figure 7:
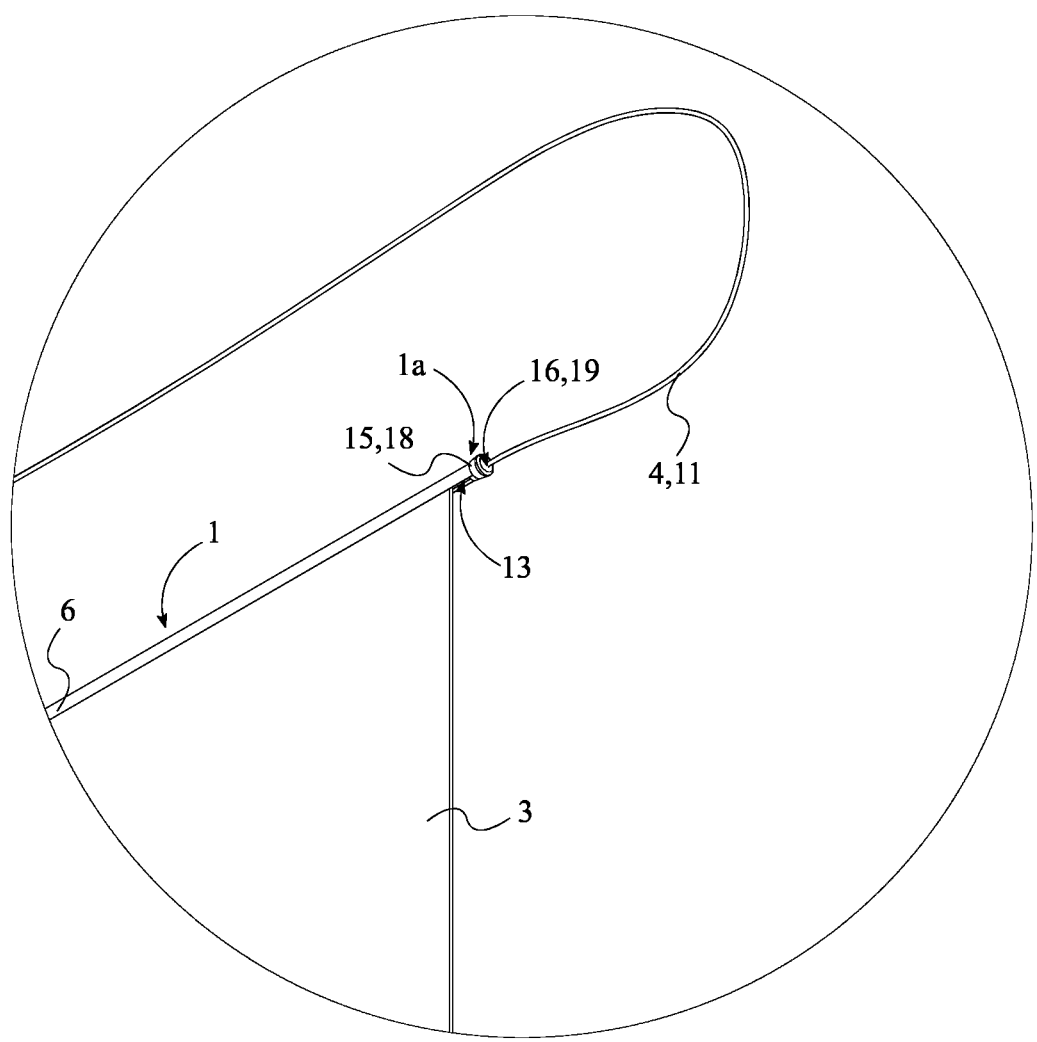
FIG. 7 is a detailed view of section 7 of FIG. 6.
Figure 8:
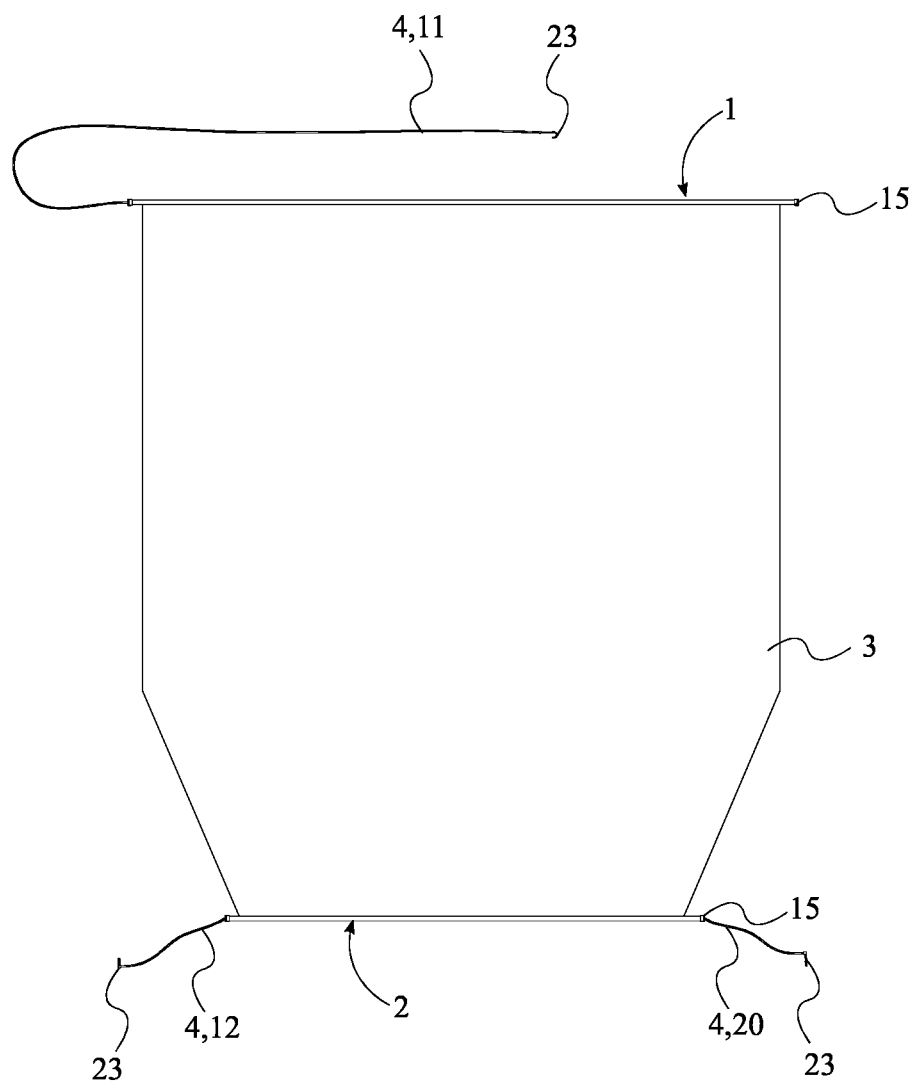
FIG. 8 is a front elevational view of the present invention.

It is an aim of the present invention to provide a removable and reusable rain cover that may be attached and removed from the golf cart in a simple and fast manner. To that end, each of the plurality of fastening cords 4 traverses through a corresponding hole 19 from the plurality of end cap holes 16. Preferably, the plurality of fastening cords 4 comprises bungee cords. However, any other holding elements, such as elastic ropes or strings (instead of bungee cords) may be employed as the fastening cord. As seen in FIG. 9, the plurality of fastening cords 4 comprises the first cord 11, the second cord 12 and a third cord 20. Further, each of the plurality of fastening cords 4 comprises a knotted end 21 and a fastener end 22, wherein the knotted end 21 is positioned opposite to the fastener end 22 across each of the plurality of fastening cords 4. As seen in FIG. 7, the knotted end 21 of the first cord 11 is terminally connected to the first rod 1, the knotted end 21 of the second cord 12 is terminally connected to the second rod 2, and the knotted end 21 of the third cord 20 is terminally connected to the second rod 2, opposite to the knotted end 21 of the second cord 12. More specifically, to accomplish this arrangement, a terminal end of the first cord 11 is taken through a corresponding end cap hole 19 and knotted inside, before securing the corresponding end cap 18 on the first rod 1. Thus, each of the first cord 11, the second cord 12 and the third cord 20 enable fastening different positions of the rain cover onto the golf cart. Furthermore, it is preferred that the knotted end 21 of the first cord 11 is positioned within, one of the plurality of end caps 15 facing the first dowel 5, the knotted end 21 of the second cord 12 is positioned within one of the plurality of end caps 15 facing the second dowel 7, and the knotted end 21 of the third cord 20 is positioned within one of the plurality of end caps 15 facing the second dowel 7. The above arrangement further ensures secure fastening of the plurality of fastening cords 4 to the first rod 1 and the second rod 2.

As seen in FIG. 7, the present invention comprises a plurality of fastening hooks 23, wherein each of the plurality of fastening hooks 23 is attached to a corresponding fastener end 22a from the plurality of fastener cords 4. Preferably, the plurality of fastening hooks 23 is a U-shaped metal hook that can hook into the plurality of end cap holes 16 and/or any appropriate position on the golf cart. However, any other fastening elements such as hook and loop fasteners, d-clips, snap clips etc. (instead of u-shaped metal hooks) that are known to one of ordinary skill in the art, and that do not hinder the intended purpose of the present invention, fall under the scope of the present invention. According to the preferred embodiment, the first rod 1 has the first cord 11 securely fastened at the corresponding end 1a, with the help of the corresponding end cap 18. Further, the corresponding fastener end 22a of the first cord 11 has a corresponding fastening hook 23a from the plurality of fastening hooks 23, which enables securing the first rod 1 to the roof of the golf cart.

According to a preferred method of operation, the first rod 1 is first placed on top of the roof of the golf cart (preferably in the roof gutter). Subsequently, the first cord 11 is taken through the lower surface of the roof, behind the two rear roof supports of the golf cart, and then the corresponding fastening hook 23a from the plurality of fastening hooks 23 fastened to the corresponding end cap 18 from the plurality of end caps 15 at the opposite end of the first rod 1. Further, the second cord 12 and third fastening cord 20 from plurality of fastening cords 4 help secure the second rod 2 to the lower section of the golf cart, so that they don't slide/move around (sailing motion) while the golf cart is in motion. Additionally, securing the second rod 2 provides extra protection to the contents at the rear section of the golf cart.

A more specific description of the preferred method of operation of the rain cover comprises the following steps: (1) removing the rain cover from a sleeve, (2) un-hooking the plurality of fastening hooks 23 from the first pipe 6 and the second pipe 8 (PVC pipe(s)), (3) securing the first rod 1 on top of the golf cart in the rear rain gutter with the help of the first cord 11 and the corresponding fastening hook 23a, (4) pulling the second rod 2 down to the lower section of the golf cart, covering the open rear section of the golf cart with the transparent sheet 3, and (5) securing the plurality of fastening hooks 23 to the rear fenders of the golf cart. If something has to be retrieved from one side of the rear section of the golf cart, only the fastener and bungee cord of that side (second cord 12 or third cord 20) may be pulled/unfastened, so that the other side remains fastened and protected. When rain has stopped and/or when the rain cover is not in use, the plurality of fastening hooks 23 connected to the second cord 12 and third cord 20 are unfastened, the transparent sheet 3 is wiped with a dry cloth, and the second rod 2 is hand rolled up with the transparent sheet 3 to a length that would allow the rain cover to be placed on top of the golf cart basket. Alternatively, the entire rain cover may be either unfastened from the roof of the golf cart, rolled up around the first rod 1, and left on the roof OR, placed back in the carry sleeve and put back within most any standard golf bag.

In an alternate embodiment of the present invention, the rain cover may be secured on any side of the golf cart and used to protect that side of the golf cart from rain. In such embodiments, the first cord 11 may be taken through the two roof supports on the side of the golf cart and secured in a similar fashion.

Although the invention has been explained in relation to its preferred embodiment, it is to be understood that many other possible modifications and variations can be made without departing from the spirit and scope of the invention as hereinafter claimed.

What is claimed is:

1. A rain cover for golf clubs on golf carts, comprising:
a first rod;
a second rod;
a transparent sheet;
a plurality of fastening cords;
the first rod comprising a first dowel and a first pipe;
the second rod comprising a second dowel and a second pipe;
the first pipe comprising a first cavity;
the second pipe comprising a second cavity;
the first cavity traversing through the first pipe;
the second cavity traversing through the second pipe;
the first dowel being positioned within the first cavity;
the second dowel being positioned within the second cavity;
the transparent sheet being connected between the first rod and the second rod;
at least one first cord being terminally connected to the first rod, wherein the first cord is from the plurality of fastening cords; and
at least one second cord being terminally connected to the second rod, wherein the second cord is from the plurality of fastening cords.

2. The rain cover of claim 1, comprising:
the transparent sheet comprising a first edge and a second edge;
the first edge being positioned opposite to the second edge across the transparent sheet;
the first edge being attached to the first dowel; and
the second edge being attached to the second dowel.

3. The rain cover of claim 1, comprising:
a first slit; and
the first slit laterally traversing through the first pipe.

4. The rain cover of claim 3, comprising:
a first edge of the transparent sheet being engaged within the first slit.

5. The rain cover of claim 1, comprising:
a second slit; and
the second slit laterally traversing through the second pipe.

6. The rain cover of claim 5, comprising:
a second edge of the transparent sheet being engaged within the second slit.

7. The rain cover of claim 1, comprising:
the first pipe comprising a first length;
the second pipe comprising a second length;
the first dowel comprising a third length;
the second dowel comprising a fourth length;
the first length being longer than the second length;
the third length being longer than the fourth length;
the third length being smaller than the first length; and
the fourth length being smaller than the second length.

8. The rain cover of claim 1, wherein the transparent sheet being hexagonal in shape.

9. The rain cover of claim 1, wherein the first rod and the second rod being cylindrical.

10. The rain cover of claim 1, comprising:
a plurality of end caps;
a plurality of end cap holes;
each of the plurality of end caps being mounted over a corresponding end of the first rod and the second rod; and
each of the plurality of end cap holes traversing centrally through each of the plurality of end caps.

11. The rain cover of claim 10, comprising:
a plurality of drainage holes;
each of the plurality of drainage holes laterally traversing through a corresponding endcap from the plurality of end caps.

12. The rain cover of claim 10, wherein each of the plurality of fastening cords traverses through a corresponding hole from the plurality of end cap holes.

13. The rain cover of claim 1, comprising:
the plurality of fastening cords comprising a first cord, a second cord and a third cord;
each of the plurality of fastening cords comprising a knotted end and a fastener end;
the knotted end being positioned opposite to the fastener end across each of the plurality of fastening cords;
the knotted end of the first cord being terminally connected to the first rod;
the knotted end of the second cord being terminally connected to the second rod; and
the knotted end of the third cord being terminally connected to the second rod, opposite to the knotted end of the second cord.

14. The rain cover of claim 13, comprising:
a plurality of fastening hooks; and
each of the plurality of fastening hooks being attached to a corresponding fastener end from the plurality of fastener cords.

15. The rain cover of claim 13, comprising:
the knotted end of the first cord being positioned within one of a plurality of end caps facing the first dowel;
the knotted end of the second cord being positioned within one of the plurality of end caps facing the second dowel; and
the knotted end of the third cord being positioned within one of the plurality of end caps facing the second dowel.

16. A rain cover for golf clubs on golf carts, comprising:
a first rod;
a second rod;
a transparent sheet;
a plurality of fastening cords;
a plurality of end caps;
a plurality of end cap holes;
the first rod comprising a first dowel and a first pipe;
the second rod comprising a second dowel and a second pipe;
the first pipe comprising a first cavity;
the second pipe comprising a second cavity;
the first cavity traversing through the first pipe;
the second cavity traversing through the second pipe;
the first dowel being positioned within the first cavity;
the second dowel being positioned within the second cavity;
the transparent sheet being connected between the first rod and the second rod;
at least one first cord being terminally connected to the first rod, wherein the first cord is from the plurality of fastening cords;
at least one second cord being terminally connected to the second rod, wherein the second cord is from the plurality of fastening cords
each of the plurality of end caps being mounted over a corresponding end of the first rod and the second rod; and
each of the plurality of end cap holes traversing centrally through each of the plurality of end caps.

17. The rain cover of claim 16, comprising:
a first edge and a second edge;
a first slit a second slit;
the first edge being positioned opposite to the second edge across the transparent sheet;
the first edge being attached to the first dowel; and
the second edge being attached to the second dowel;
the first slit laterally traversing through the first pipe;
the first edge being engaged within the first slit;
the second slit laterally traversing through the second pipe; and
the second edge being engaged within the second slit.

18. The rain cover of claim 16, comprising:
the plurality of fastening cords comprising a first cord, a second cord and a third cord;
each of the plurality of fastening cords comprising a knotted end and a fastener end;
the knotted end being positioned opposite to the fastener end across each of the plurality of fastening cords;
the knotted end of the first cord being terminally connected to the first rod;
the knotted end of the second cord being terminally connected to the second rod; and
the knotted end of the third cord being terminally connected to the second rod, opposite to the knotted end of the second cord.

19. The rain cover of claim 18, comprising:
a plurality of fastening hooks; and
each of the plurality of fastening hooks being attached to a corresponding fastener end from the plurality of fastener cords.

20. The rain cover of claim 18, comprising:
the knotted end of the first cord being positioned within one of the plurality of end caps facing the first dowel;
the knotted end of the second cord being positioned within one of the plurality of end caps facing the second dowel; and the knotted end of the third cord being positioned within one of the plurality of end caps facing the second dowel.

\* \* \* \* \*